US007392935B2

(12) United States Patent
Byrne et al.

(10) Patent No.: US 7,392,935 B2
(45) Date of Patent: Jul. 1, 2008

(54) METHOD AND APPARATUS FOR ACCEPTING CHECK DEPOSITS VIA THE INTERNET USING BROWSER-BASED TECHNOLOGY

(75) Inventors: Michael D. Byrne, Edina, MN (US); Byron G. Chun, Daly City, CA (US); Art Molina, Scottsdale, AZ (US); Frank S. Lee, Bakersfield, CA (US); Stephanie Sturgis-Griffith, Oakland, CA (US); Bipin M. Sahni, Pleasanton, CA (US); Gene Weisbord, Martinez, CA (US); Deborah A. Young, Los Angeles, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 165 days.

(21) Appl. No.: 11/351,457

(22) Filed: Feb. 9, 2006

(65) Prior Publication Data

US 2006/0249567 A1    Nov. 9, 2006

Related U.S. Application Data

(60) Provisional application No. 60/652,078, filed on Feb. 10, 2005.

(51) Int. Cl.
*G06Q 40/00* (2006.01)
(52) U.S. Cl. .......................... 235/379; 705/39; 705/40; 705/42; 705/43
(58) Field of Classification Search ................. 235/379; 705/35, 36, 37, 38, 39, 40, 41, 42, 43, 44, 705/45
See application file for complete search history.

(56) References Cited

U.S. PATENT DOCUMENTS

| 5,220,501 | A | 6/1993 | Lawlor et al. |
| 5,677,955 | A | 10/1997 | Doggett et al. |
| 6,202,054 | B1 | 3/2001 | Lawlor et al. |
| 6,429,952 | B1* | 8/2002 | Olbricht ..................... 358/442 |
| 6,450,403 | B1 | 9/2002 | Martens et al. |
| 6,474,548 | B1 | 11/2002 | Montross et al. |
| 6,554,185 | B1 | 4/2003 | Montross et al. |
| 6,609,200 | B2 | 8/2003 | Anderson et al. |
| 6,754,640 | B2 | 6/2004 | Bozeman |

(Continued)

FOREIGN PATENT DOCUMENTS

EP    0 984 410 A1    3/2000

(Continued)

OTHER PUBLICATIONS

The Internet article "Deposit Now: What's the Difference" by BankServ™. The article was available as of Aug. 23, 2007 at https://www.depositnow.com/depositnow/depositnow.com/products/versions.html.*

(Continued)

*Primary Examiner*—Daniel A Hess (57) ABSTRACT

A browser plug-in to drive a device for securely transmitting documents in real-time over the Internet into an enterprise's computing environment is provided. Leveraging the Check Clearing for the 21st Century Act, a system and method for providing a browser plug-in that allows a bank customer to scan checks using a personal computer and deposit the checks via the browser to a bank account is provided.

30 Claims, 8 Drawing Sheets

U.S. PATENT DOCUMENTS

| | | | |
|---|---|---|---|
| 2001/0018739 A1 | 8/2001 | Anderson et al. |
| 2001/0034720 A1 | 10/2001 | Armes |
| 2002/0001393 A1 | 1/2002 | Jones et al. |
| 2002/0004781 A1 | 1/2002 | Forsyth |
| 2002/0023055 A1 | 2/2002 | Antognini et al. |
| 2002/0038289 A1 | 3/2002 | Lawlor et al. |
| 2002/0046057 A1 | 4/2002 | Ross |
| 2002/0065786 A1 | 5/2002 | Martens et al. |
| 2002/0084321 A1 | 7/2002 | Martens et al. |
| 2002/0091635 A1 | 7/2002 | Dillip et al. |
| 2002/0133467 A1 | 9/2002 | Hobson et al. |
| 2002/0152164 A1 | 10/2002 | Dutta et al. |
| 2002/0152165 A1 | 10/2002 | Dutta et al. |
| 2002/0152166 A1 | 10/2002 | Dutta et al. |
| 2002/0152169 A1 | 10/2002 | Dutta et al. |
| 2002/0152170 A1 | 10/2002 | Dutta et al. |
| 2003/0023531 A1 | 1/2003 | Fergusson |
| 2003/0023557 A1 | 1/2003 | Moore |
| 2003/0089768 A1 | 5/2003 | Page |
| 2003/0097331 A1 | 5/2003 | Cohen |
| 2003/0202690 A1 | 10/2003 | Jones et al. |
| 2003/0212904 A1 | 11/2003 | Randle et al. |
| 2003/0217005 A1 | 11/2003 | Drummond et al. |
| 2004/0016796 A1 | 1/2004 | Hanna et al. |
| 2004/0044606 A1 | 3/2004 | Buttridge et al. |
| 2004/0111371 A1 | 6/2004 | Friedman |
| 2004/0133516 A1 | 7/2004 | Buchanan et al. |
| 2004/0138896 A1 | 7/2004 | Cheng |
| 2004/0138991 A1 | 7/2004 | Song et al. |
| 2004/0158532 A1 | 8/2004 | Breck et al. |
| 2004/0199422 A1 | 10/2004 | Napier et al. |

FOREIGN PATENT DOCUMENTS

| | | | |
|---|---|---|---|
| WO | WO 96/31965 | | 10/1996 |
| WO | WO 98/26364 | | 6/1998 |
| WO | WO 98/37655 | | 8/1998 |
| WO | WO 00/55793 | | 9/2000 |
| WO | WO 00/57330 | | 9/2000 |
| WO | WO 01/61436 | A2 | 8/2001 |
| WO | WO 01/61569 | A2 | 8/2001 |
| WO | WO 01/80145 | A2 | 10/2001 |
| WO | WO 01/84453 | A1 | 11/2001 |
| WO | WO 02/075478 | A2 | 9/2002 |

OTHER PUBLICATIONS

Remote Deposit. http://www.bankserv.com/products/remotedeposit.htm.

A Browser-Based Solution that Leads the Way to the Future of Imaging. http://www.brasfieldtech.com/checkimaging.php.

Check Imaging. A Browser-Based Solution that Leads the Way to the Future of Imaging. http://www.brasfieldtech.com.

Check 21. http://wqad.com/Global/story.asp?S=2420912&nav=1sWARuwM.

Products. Digital Check. http://www.digitalcheck.com/I1_products.html.

Maverick Check Scanning Solutions. Progressive Business Systems, Inc. http://pbsoffice.com/micro_replacement.htm.

Optical Character Recognition for Self-Service Banking. At&T Technical Journal. Jul./Aug. 1995.

Wang, et al. A Falut Tolerant Chinese Bank Check Recognition System. 1997 IEEE Intl Conf on Intelligent PRocessing Systems. IEEE. New York, NY. Oct. 1997. Beijing, China.

Yao, et al. Document Scanning with a New Family of Experimental High-Performance TDI-CCD Imaging Devices. Electronic Imaging '88. Intl. Electronic Imaging Expo and Conf. Mar. 1988. Anaheim, CA.

* cited by examiner

METHOD AND APPARATUS FOR ACCEPTING CHECK DEPOSITS VIA THE INTERNET USING BROWSER-BASED TECHNOLOGY

CROSS-REFERENCE TO RELATED APPLICATIONS

This application claims priority to U.S. Provisional Patent Application Ser. No. 60/652,078, filed on Feb. 10, 2005, which application is incorporated herein in its entirety by the reference thereto.

BACKGROUND OF THE INVENTION

1. Technical Field

The invention relates to providing a plug-in to drive a device for securely transmitting documents in real-time over the Internet into an enterprise's computing environment. More particularly, the invention relates to a system and method for providing a browser plug-in that allows a bank customer to scan checks using a personal computer and deposit the checks via the browser to a bank account.

2. Description of the Prior Art

The Check Clearing for the 21st Century Act, better known as Check 21, modernized the U.S. payments system. This new federal legislation, which took effect on Oct. 28, 2004, allows banks to create and present a substitute check or image replacement document (IRD) for payment in place of the original check, accelerating settlement and eliminating many of the costs and risks of physically transporting checks.

Presently, consumers have available to them the traditional banking visit model. Also, mechanisms for allowing banks to create and present a substitute check exist in the market, however, they require the customer to install a non-browser-based software application, referred to as a fat client. Also, known problems with float, fraud, and check processing speed are present in these mechanisms.

Currently, there are systems and methods that relate to check deposit and image processing at locations other than a bank, as follows. M. Martens, C. P. Tresser, R. J. Von Gutfeld, and C. W. Wu, *Method and Apparatus for Depositing Ordinary Checks from Home or Office*, U.S. Pat. No. 6,450,403 B1 (Sep. 17, 2002) and M. Martens, C. P. Tresser, R. J. Von Gutfeld, and C. W. Wu, *Method and Apparatus for Depositing Ordinary Checks from Home or Office*, U.S. Patent Application Publication No. US 2002/0084321 A1 (Jul. 4, 2002) discuss an apparatus and method that allow depositing ordinary checks from home or office. A special scanner is used to scan an endorsed check for deposit. The check may have printed thereon encryptions in at least selected locations. Scanning the endorsed check with the scanner generates a digitized version of the check. The scanner virtually partitions the digitized version of the check into a plurality of regions. These regions may be stripes or zones. Each region is successively examined to extract from the digitized version of the check information from that region. The information extracted from a region is encrypted and transmitted to a bank. Upon acknowledgment from the bank, at least some of the regions of the plurality of regions are voided by a form of indelible but non-invasive, e.g. allowing reading after voiding, marking, such as punched holes, burned areas, overprinting of a pattern. The processing by the scanner continues until all regions have been processed. This progressively voiding scheme is an important security feature. The scanner is preferably contained in a secure housing with an encryption processor and the housing preferably includes an arrangement for detecting tampering and preventing normal operation if tampering is detected.

J. E. Jones, P. A. Jones, R. M. Gafron, W. J. Jones, and D. U. Mennie, *Image Processing Network*, U.S. Patent Application Publication No. US 2002/0001393 A1 (Jan. 3, 2002) discuss a paperless image processing network where images and other information are exchanged between various financial institutions rather than physical documents. Further discussed is an image processing network where images and other information as well as physical documents are exchanged between various financial institutions. Also discussed is an image processing network where the processing of document images is distributed amongst various locations rather than concentrated at a single central location. Also discussed is an image processing network which is capable of processing both images and physical documents; an image processing network which is capable of extracting the MICR, CAR, and LAR data from checks and inserting this data into an image file or files; an image processing network where images are sorted between transit and on-us image files; and a data file format that comprises two subparts, containing image data and the other part containing data extracted from the document's image.

M. Martens and C. P. Tresser, *Method and Apparatus for Depositing Paper Checks from Home or Office*, U.S. Patent Application Publication No. US 2002/0065786 (May 30, 2002) discuss a method and apparatus in combination with a special form of paper checks, which allows for the secure deposit of paper checks from home or office; in other words, at a location other than the bank or an ATM. The apparatus can be implemented at the payee's home or office with a Personal Computer (PC) which has a scanner attached to it and connected to the World Wide Web (WWW) on the Internet. The process of depositing paper checks begins by the payee endorsing a check having printed thereon encryptions in at least selected locations where information is written by a payer, the act of writing by the payee obscuring some of the encryptions. The payee then scans the endorsed check with a scanner to generate a digitized version of the check. The computer extracts from the digitized version of the check a concatenated branch number, account number and check number and a corresponding digital signature. The payee then transmits the extracted information together with the digitized version of the check for deposit. The checks are specially designed to prevent fraud such as alterations of the payee, amount and multiple deposits. In addition to the encryptions imprinted on the check, a secret key and a plurality of digital signatures are generated based on the concatenated branch number, account number and check number.

Ravi V. Acharya and J. Kang, *System and Method for Electronic Deposit of Third-Party Checks by Non-Commercial Banking Customers from Remote Locations*, International Publication No. WO 01/61436 A2 (23 Aug. 2001) discuss a system and method for initiating a deposit transaction, where the depositor is a non-commercial banking customer located at a remote location, and where the item to be deposited is a paper check from a third party, payable to the depositor. Features include a Remote Customer Terminal (RCT) with certain input devices, connected to a bank system. The image and/or other data sent from the RCT to the Bank of First Deposit (BOFD) may be processed by conversion to Electronic Funds Transfer (EFT), via Electronic Check Presentment (ECP), or via check reconstruction.

A. Slater, M. L. Sears, H. P. Rin-Rin, D. C. DO, H. P. McSharry, E. M. R. Dudasik. S. M. Gryte, and R. O. Brooks, *System and Method for Image Depositing, Image Present-* ment and Deposit Taking in a Commercial Environment, European Patent Application No. EP 0 984 410 A1 (08 Mar. 2000) discuss a method and system for scanning a check and/or cash to create an electronic image of the front and the back of the check and/or cash. The image is then processed and transmitted electronically to a central location. The image may be recreated into a paper form at the central location, resembling the original paper check or cash. Paperless processing of checks and cash is thus provided, including local voiding and storage of the check without requiring immediate pickup, while still allowing the transaction to be processed.

However, none of the references cited teach or suggest creating efficiencies by providing a browser plug-in that allows a bank customer to scan checks using a personal computer and deposit the checks via the browser to a bank account, while, at the same time, provide a light client vs. heavy client side footprint/solution and provide means for a customer to install software via application-managed download.

It would be advantageous to provide a system and method for capturing data objects from a programmed machine where the configuration is not limited to a fixed location, office, or home personal computer; where a supported capturing device, such as a scanner, is plugged into the programmed machine, e.g. a personal computer, at any location that works with downloadable runtime components, such as plug-in software, and can be used to capture data objects, e.g. to scan checks and prepare deposits.

It would be advantageous to improve operating efficiencies by providing faster access to money deposited in a customer's account and providing increased flexibility to invest and direct funds.

It would further be advantageous to provide a system and method that can handle reductions in float as the time to settle transactions between banks decreases.

It further would be advantageous to provide a system and method that displays substitute checks or copies of substitute checks online when a customer requests check copies or view images online.

It further would be advantageous to provide a system and method that allows a bank customer to be able to capture electronic images of the customer's checks and to transmit the checks for processing instead of requiring the customer to physically transport the checks to the bank for deposit.

It further would be advantageous to provide a system and method that attains the following business goals:

provide faster access to funds and information;
reduce transportation time and costs;
leverage Check 21 legislation;
provide alternative to traditional banking visit;
provide low cost entry point to market model; develop, deploy, and manage such; and
enrich customer experience.

It further would be advantageous to provide a system and method that attains the following technical goals:

provide a light client vs. heavy client side footprint/solution;
provide means for a customer to install software via application-managed download;
provide means for a customer to scan checks and upload them to the application;
provide an application that validates checks and creates deposit transactions;
provide an application that sends deposit transactions to an existing downstream item processing;
provide for the customer access to timely information on the status of the customer's deposit or any errors which would prevent an item from being accepted; and
provide a same and/or better than response time.

SUMMARY OF THE INVENTION

A browser plug-in to drive a device for securely transmitting documents in real-time over the Internet into an enterprise's computing environment is provided. Leveraging the Check Clearing for the 21st Century Act, a system and method for providing a browser plug-in that allows a bank customer to scan checks using a personal computer and deposit the checks via the browser to a bank account is provided.

DETAILED DESCRIPTION OF THE INVENTION

A browser software plug-in to provide an interface between the user and an enterprise and drive a device for securely transmitting documents in real-time over the Internet into an enterprise's computing environment is provided. Leveraging the Check Clearing for the 21st Century Act, a system and method for providing a browser plug-in that allows a bank customer to scan checks using a personal computer and deposit the checks via the browser to a bank account is provided.

It should be appreciated that for the purposes of understanding the invention, the discussion herein involves a personal computer, a scanner, scanned image, a deposit post-process, and the like. However, such specific references herein are by way of example only and are not meant to be limiting. The spirit and scope of the invention covers any thin client with respect to any enterprise post processing and any type of capturing device and captured data object, where here an object includes, but is not limited to, any digitized image, portion of an image, data stream, screen, or window.

In one embodiment of the invention, five major components are provided to work in a manner that allows the user to scan, transmit, and deposit checks or documents to the receiving organization electronically. A personal computer type computer (PC), application software provided by the enterprise or third-party supplier (application software), a scanner supported by the application software (scanner), scanner drivers provided by the scanner manufacturer or third-party (device drivers), and a receiving software application to process the incoming images and data (enterprise application).

Three of the components: PC, scanner, and device drivers can be packaged by any major computer manufacturer. The application software provider can either make special arrangements with the PC provider to include the software or the provider can use other means to distribute the software. The enterprise application is the responsibility of the enterprise.

Application software can be packaged in two basic forms. The first form is normally distributed by media, such as CD-ROM, or electronically downloaded. Once in the hands of the user, the application software is installed on the machine where it stays resident on disk and is loaded into memory when used. The software industry refers this type of application as a fat application, i.e. stays on machine. Application software, installed in this manner, also normally has access to the resources such as scanners, disk drives, and other applications available on the machine within the authorization scope of the user. Additionally, software maintenance, changes or new features for fat applications require the software provider to distribute the software and for the user to install the software. If the maintenance is faulty, additional roll-back steps or software maintenance is required. Because not all users can be expected to install software at the same time, software providers are forced into a position to support multiple, often back-leveled versions of software.

The second form is distributed with each invocation of the application software through the ubiquitous browser interface available on almost every modern personal computer. The software industry refers to this type of application as a thin client. No software is installed on the disk. The application software is the same version for all users because the plug-in is downloaded with each invocation of the application software, i.e. automatic maintenance. The plug-in does not automatically have the same level of access to the resources that the user has. This security feature allows the user to give permission to the resource being requested, e.g. scanner, not all of the resources available to the user. The combined benefits of security with ease and speed of software maintenance makes the thin-client approach a more beneficial approach to both the customer and the enterprise.

Figure 1:
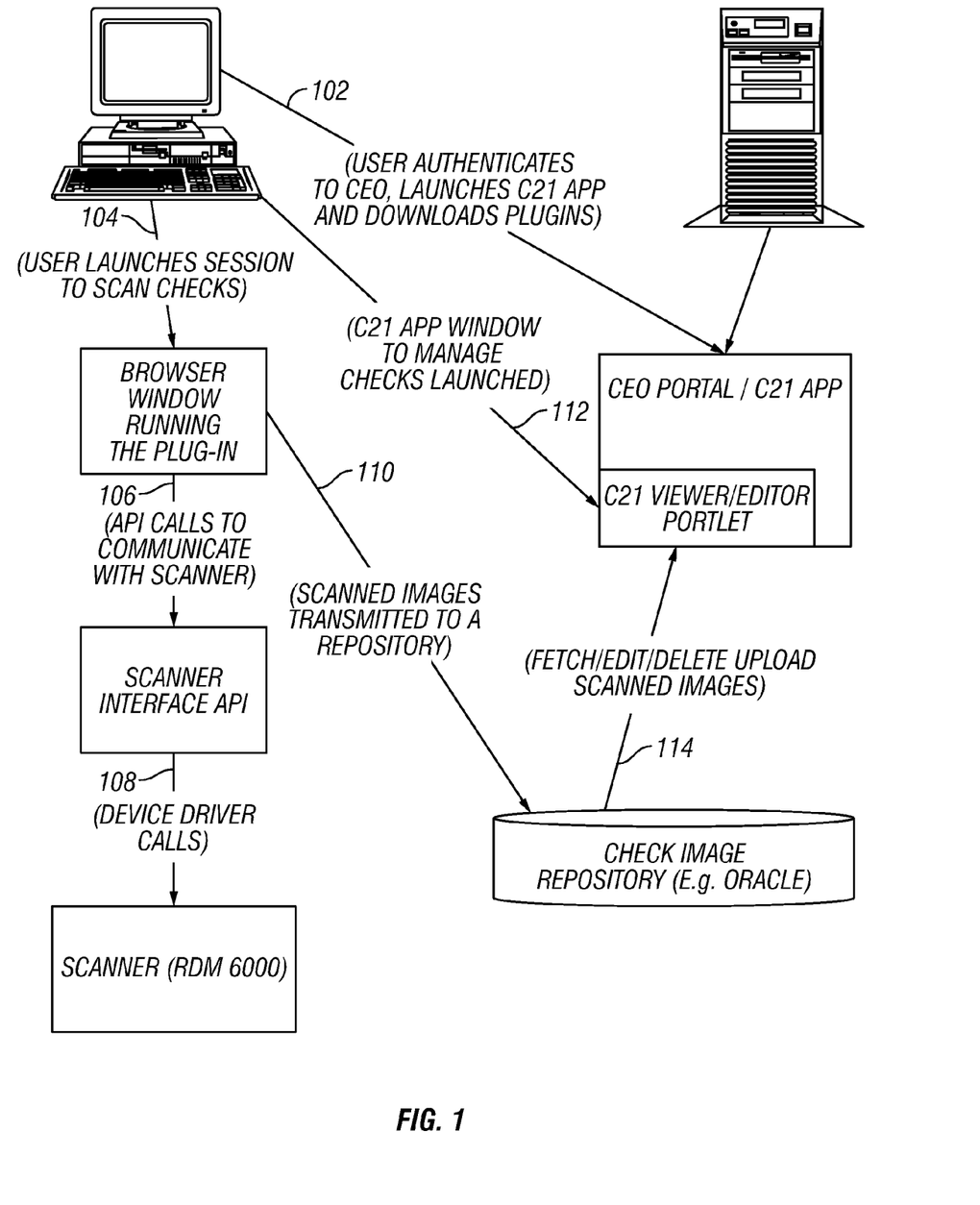
FIG. 1 is a schematic flow diagram showing a high level flow of a desktop deposit according to the invention.

One embodiment of the invention can be described with reference to FIG. 1, a schematic flow diagram showing a high level flow of a desktop deposit according to the invention. From a client means, for example, a personal computer type computer (PC), a client/user authenticates with a desktop deposit application 102. In this example, the server related software is referred to as Wells Fargo's Commercial Electronic Offices[SM] Portal (CEO Portal or just CEO) and the desktop deposit application is referred to as C21 App. After authentication, C21 App is launched and the appropriate desktop deposit plug-in(s) is downloaded onto the client PC.

The CEO Portal, C21 app as well as the plug-in are resident on the enterprise servers. The user launches a session for scanning checks from the browser window running the plug-in(s). Scanner interface APIs are called from the browser plug-in(s) for communicating with a scanning device that is communicably connected to the PC 106. The scanner APIs make device driver calls to the scanner, which in this example is RDM 6000. The user proceeds with scanning one or more checks through the device. Each check can be marked with indelible ink, if the scanner is so equipped, indicating that the check has been electronically processed. Such scanned images are transmitted by the browser window running the plug-in(s) to a check image repository communicably connected to the server desktop deposit application 110. The desktop deposit application, C21 App is used to manage the checks which are launched. Through a viewer and editing application, which in this example is referred to as C21 Viewer/Editor Portlet, which is a part of C21 App, a user can view and edit commands related to images stored on the check image repository that had been previously scanned 112. Likewise, through C21 Viewer/Editor Portlet, a user can perform various functions, such as fetch, edit, and delete on the scanned images 114.

The invention provides flexibility as follows. In one embodiment of the invention, the system and method has the capability to perform version checks and updates. In one embodiment of the invention, the system and method is modular; it employs framework adaptability to support future plug-ins as necessary to work with a wide variety of proprietary check-reader device protocols. In one embodiment of the invention, the system and method provides the capability of the self-detection of installed scanner device and capability to guide the user of related events and detects necessary downloads, upgrades, and patches.

One embodiment of the invention provides a helper application that facilitates the following:
  scanning of checks, front and back;
  MICR decoding;
  compression and encryption;
  allowing user to enter check amount and annotation;
  single submission and batching of scanned checks; and
  uploading one or a batch of checks to a staging repository via database and/or FTP uploads.

System Interface Architecture

Figure 2:
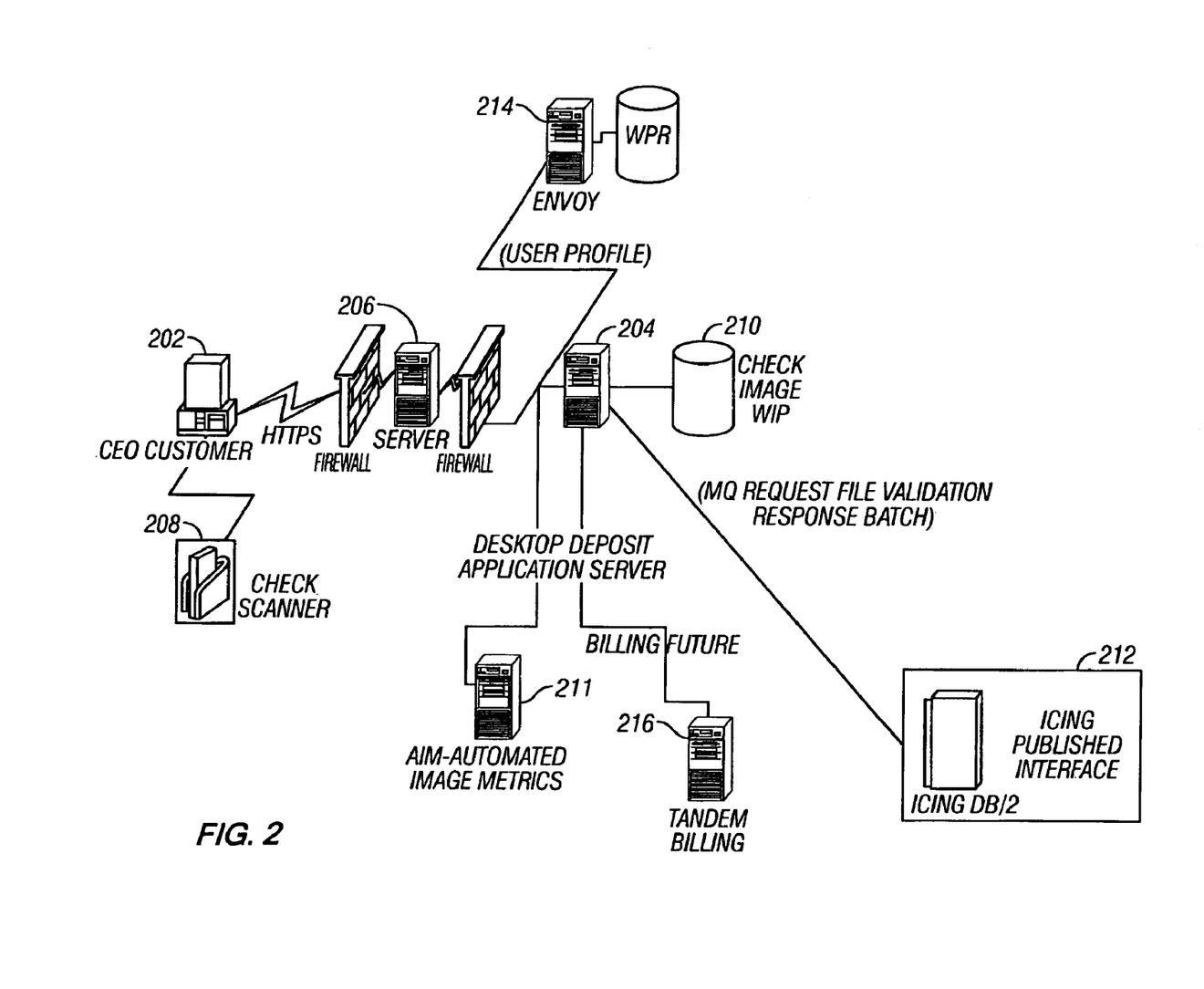
FIG. 2 is a schematic diagram of an interface architecture system according to the invention.

An interface architecture system and method according to one embodiment of the invention can be described with reference to FIG. 2. A desktop deposit customer, shown here as a CEO customer 202, is authenticated and authorized by applications on the desktop deposit server, shown here as DesktopDeposit (DD) Application Server 204. A second server 206 is shown between two firewalls and serves to provide a secure interface between external applications and those internal to an enterprise, such as Wells Fargo, for example. The customer proceeds to scan one or more checks through the check scanner device 208. The customer uploads the scanned check images to the DD application server for post processing. The uploaded images are stored, could be temporarily, in a database, shown in FIG. 2 as Check Image Work in Progress (WIP) 210 for review and disposition. The images are also sent, for example, via an wfXML service, to an Image Inspector Services 211, referred to herein as Automated Image Metrics (AIM). AIM is a placeholder for certain basic services. For example, AIM can perform character recognition on a image, e.g. courtesy amount recognition and legal amount recognition (CARLAR) processing. For instance, a customer might write an amount of X in the courtesy box and an amount of Y in the legal amount box resulting in a mismatch. The system and method can respond by sending such information back to the customer, informing the customer of such mismatch. As well, the system and method can provides hints, such as "Okay, the person wrote the check for a hundred dollars. Do you agree? Yes." Then, instead of keying in 100, the customer can simply click the "yes" button. The scanned images are sent to a second database, shown here as Inbound Check Image Gateway (ICING) 212, to be checked again for quality and customer disposition. The DD Application Server 204 requests or sends a message query to ICING 212 for file validation and response, and possibly in batch mode. DD Application Server sends user profile information, including account information, product profile information, and the like, to enterprise backend servers. One such server is shown in the figure as Envoy 214.

Customer billing information is sent to a backend system, shown here as Tandem Billing 216.

In this particular example of one embodiment of the invention, an ActiveX component (VC++) is used for interacting with the device API, referred to herein as Ranger API, for scanning the checks. The Envoy client is used for retrieving the entitlements. The Envoy client uses T3 protocol, which is proprietary to WebLogic Application Server. DD Application Server uses HTTPS/Post for interfacing with AIM. A Wells Fargo standard, WFXML, is followed for making the request/response to AIM service. DD Application Server posts messages in X9.37 format to ICING MQSeries queue. DD Application Server uses standard JDBC implementation to interact with Work In Progress (local) Database. For retrieving Account Name needs to interact with internal system using Xstream Interface. For RTN validation an external system is used. It should be appreciated that the implementation described hereinabove is for illustrative purposes and is not meant to be limiting.

In one embodiment of the invention, the system and method incorporates a detection and notification mechanism. In one embodiment of the invention, the DD Application Server takes certain customer profile information, such as type of scanner, account numbers for which the customer is authorized, etc., and uses the information to detect certain states, such as, if the customer's scanner is plugged in, and appropriately notify the customer. Following is a list of examples of what the detection mechanism can detect: If the scanner is the right version; Was a part of the scanner plugged in the wrong way; if there is a problem with the firmware, i.e. the electronically erasable module on the scanner; etc. The invention can provide a link to the customer from where the customer can download the appropriate helpful information or applications.

Also, if a new application feature becomes available and, for example, the user has a particular scanner model that has an old version of their basic drivers, the invention can download or direct the customer to a place where the customer can get the driver sets that are designed for the system or application and can download them. The customer can elect to have a system administrator install the feature and appropriate updates or a LAN administrator, and the like. As well, the enterprise can perform the installation, downloads, and upgrades given permission. A clear advantage the invention provides to the enterprise and to the customer is the efficiency provided by the enterprise not having to ship CDs and the like to customers. The installations and upgrades are performed in real-time. Such makes the customer interaction and experience much better.

Application Component Architecture

An exemplary application component architecture for the DD Application Server according to one embodiment of the invention can be described with reference to FIG. 3. Such example is not meant to be exhaustive or limiting. The DD Application Server is also referred to herein simple as Desktop Deposit.

In this example implementation, the Desktop Deposit application applies a Java 2 Enterprise Edition (J2EE) component architecture for developing a flexible, scalable, cross-platform enterprise application. The Desktop Deposit application uses Struts framework for developing applications. A strut is based on Model-View-Controller (MVC) architecture. An MVC design pattern serves as a guideline for building the Desktop Deposit Application. By applying the MVC architecture to a J2EE application, one can separate the core data access functionality from the presentation and control logic that uses this functionality. Such separation allows multiple views to share the same enterprise data model, which makes supporting multiple clients easier to implement, test, and maintain.

Figure 3:
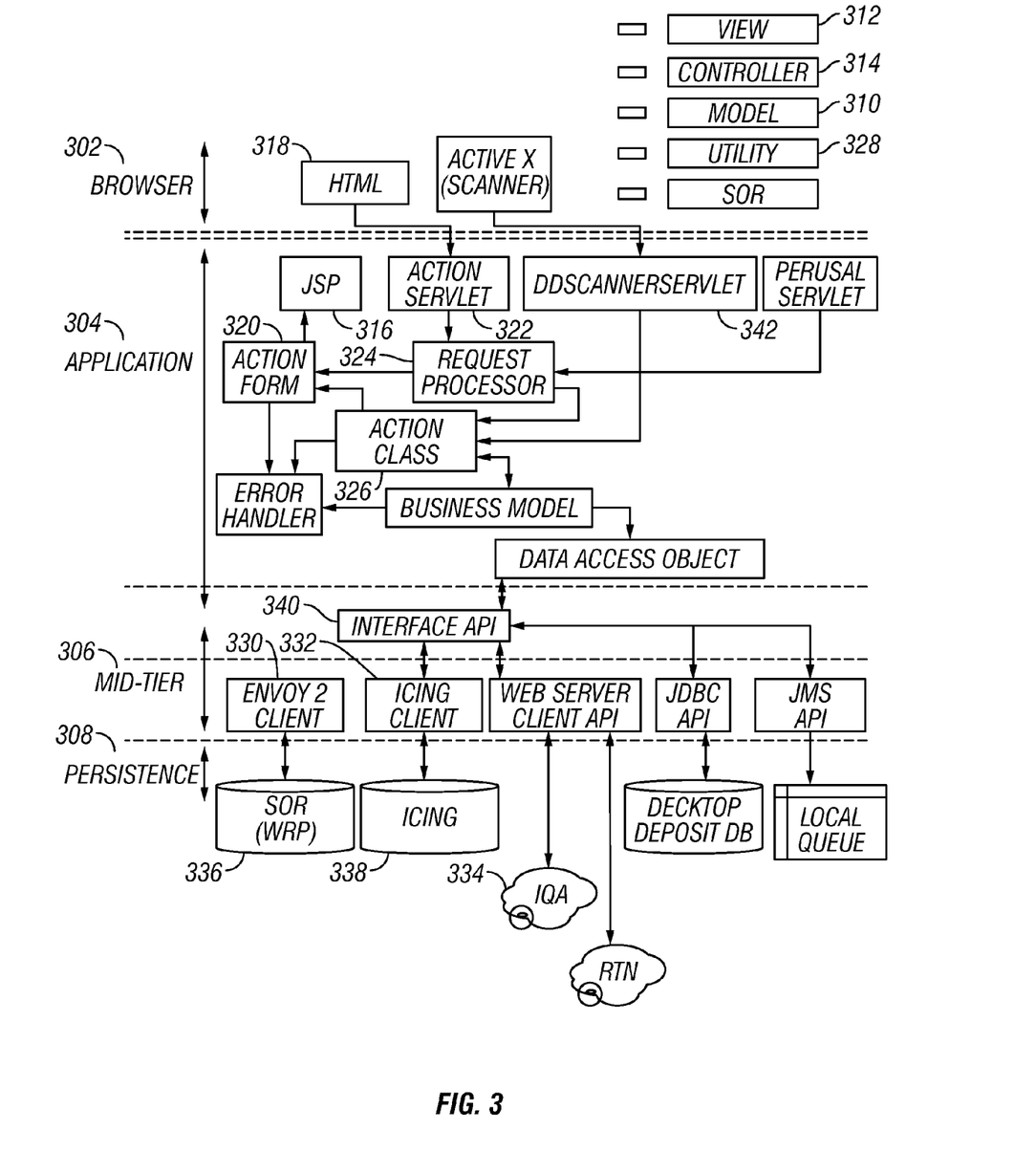
FIG. 3 is a schematic diagram of an application component architecture for the DD Application Server according to the invention.

FIG. 3 shows main components for the following tiers: browser 302; application 304; mid-tier 306, and persistence 308. Descriptions of specific components follow.

Model

Model 310 represents business data, and the business rules that govern access and modification of that data, on which application is based. Models that have been envisaged for Desktop Deposit include:

Business Model classes: these classes encapsulate business objects and business rules from the requirements/use-cases; and Data Access Object Classes for interface with Desktop Deposit database and other applications.

View

View 312 presents data represented by the model 310 in a way that's targeted at a specific type of client. In Desktop Deposit, view objects include HTML, JSP, Java Script and Style Sheets. Data in JSP 316 s extracted from Action Form 320, which is part of View. These JSPs eventually generate HTML on the web server, which is sent to the client 318. Following are the View 312 components:

Action Form 320: For every screen, there is an individual Action Form 320. JSP 316 extracts data from Action Form 320 and display it to the client via HTML 318.

Controller

The controller 314 maintains the data in the model 310 and ensures that the data presented by the view 312 is consistent with the corresponding model. Following are the controller components:

Action Servlet 322 serves as the front component of controller and all requests come through it.

Request Processor 324 controls the navigation requirement of moving from one screen to another.

For every screen there is an individual Action Class 326. Desktop Deposit controller 314 loads them dynamically and they update databases based on user action with the help of utility classes, described hereinbelow. Action Class loads the data dynamically and sets Action Form 320 for displaying data in the JSP 316.

Utility Classes

Utility classes 328 contain functionality that are frequently used across application components. Following are utility classes as per the example:

Proxy classes to interface with Envoy2 client 330, ICING client 332, Image quality Assessment (IQA) 334, and IVU.

General-purpose classes encapsulating date manipulation functions and primitive validations, etc. Desktop Deposit utility classes are reused where possible.

Classes for converting Data Objects into URLs/Character Streams to be passed to Envoy2 330 and into Data Objects for response received from Envoy2 330.

Interface API

Interface API 340 is a Java API library developed for accessing the external systems like WPR 336 and ICING 338. Code is built in the Desktop Deposit application to provide a wrapper to access this functionality. The Interface APIs used by Desktop Deposit are Envoy2 Middleware 330, ICING Middleware 332, IVU [?], and Image Quality Analyzer 334.

Interface Between Application and ICING

Desktop Deposit Application Interfaces with ICING Using MQ Series.

The images of checks transmitted with the file are retained and archived by the enterprise, i.e. in this example, Wells Fargo bank (WFB), for use in research and adjustments and for legal compliance purposes. These images are also made available for customer retrieval, through associated WFB information reporting products. Each incoming item is assigned a unique item sequence number (ISN), based on Wells Fargo standards and including a parameter-driven sender identifier. The ISN is included with the related item record in file and should be printed, if possible, on the paper item by the check transport device to support easy retrieval of the original item from temporary storage when necessary.

This file format is based on the ANSI X9.37 DSTU—2003 "Specifications for Electronic Exchange of Check and Image Data" draft standard with some modifications to accommodate the processing of credits, such as customer Direct Deposit Account (DDA) deposits and adjustments, and to augment sender source identification and file balancing controls.

To ensure proper processing, it is important that all deposits on a file are transmitted in sequential order, and, for example, deposit credit before associated checks, and that each credit and debit item is assigned a unique, i.e. within business day, Item Sequence Number (ISN).

The ISN is 15 digits, with format as follows: 000SSSSDD-NNNNNN, and where:

000=leading zeroes;
SSSS=four-digit numeric Sender ID (Bank-assigned);
DD=two-digit device or location number (00-99—Sender-assigned); and
NNNNNN=six-digit incrementing item sequence number.
Available file transmission methods include:
Secure File Transport (SFT) via the Internet; and
Direct transmission via T-1 line or other direct connection, utilizing Connect:
Direct Network Data Mover (NDM), etc.

Interface Between Application and Image Quality Analyzer (AIM)

The interface from Desktop Deposit Application to the IQA system follows WFXML 1.2 standard. Application uses soap over https protocol for communication with IQA.

Interface Between Application and Image Scanner API

One embodiment of the invention uses VBScript/JavaScript to communicate with the ActiveX component. The ActiveX component interacts with a customized scanning device API, herein referred to as Ranger API, which in turn interacts with the scanner.

For performance consideration a DDScannerServlet 342 which receives the client images, posts the images to the local queue using a business layer. The possibilities of making the queue cluster aware are typically covered during design.

Image Viewer Utility

Image viewer utility helps the user in viewing the image in an appropriate image size. It provides following functionality to the user:

Ability to lighten an image, default increment should be +25;
Ability to darken the image, default increment should be −25;
Ability to invert an image;
Ability to rotate the image in increments of 90 degrees in both directions;
Ability to zoom in or out on the image; and
Ability to scroll left, right, up or down on an image any time the full image is not visible in the window.

Interface Between Application and Image Viewer Utility

The invoking application is able to determine and adjust the following:

How many image viewer windows to display on the page, typically one or two;
What operations to apply to the image before displaying as "default," i.e. shrinking, lightening, rotating, etc.;
What the maximum zoom level should be, such as in terms of a percent of the original image size;
What the zoom increment is;
What the lighten/darken increment is; and
What options to display besides Image Print and Download, for example on a bar below the image viewing window and such as showing or hiding the View Full Size link as desired.

Keep Alive Utility

This is a utility, which is useful when on a particular screen and background processes are taking some time for processing. It shows the user a screen displaying information about progress information.

WIP Database

The application uses a database, such as Oracle, for storing information. The images local to the system can be stored in Binary Large Object (BLOB) format.

Configuration Files

The system and method uses properties files that configure the Application Environment.

DDEnv.properties is a file for storing all the application related environment properties:
JDBC Protocol Related Properties;
Logging Related properties;
Audit Related properties;
EPICS Envoy Related Properties; and
ICING Related properties.
DDApp.properties is a file for storing all the application related properties:
Timeout properties; and
URLs of Desktop Deposit Pages.

ActiveX Component

The client side components, herein referred to as CLASP for CEO Lightweight Automated Scanner Process, are developed as ActiveX controls downloadable over the web. The CLASP component provides the interfaces required for the CEO application to interact with a scanner. CLASP provides the abstraction layer required to interact with scanner interface framework, which is Ranger Scanner API.

Figure 4:
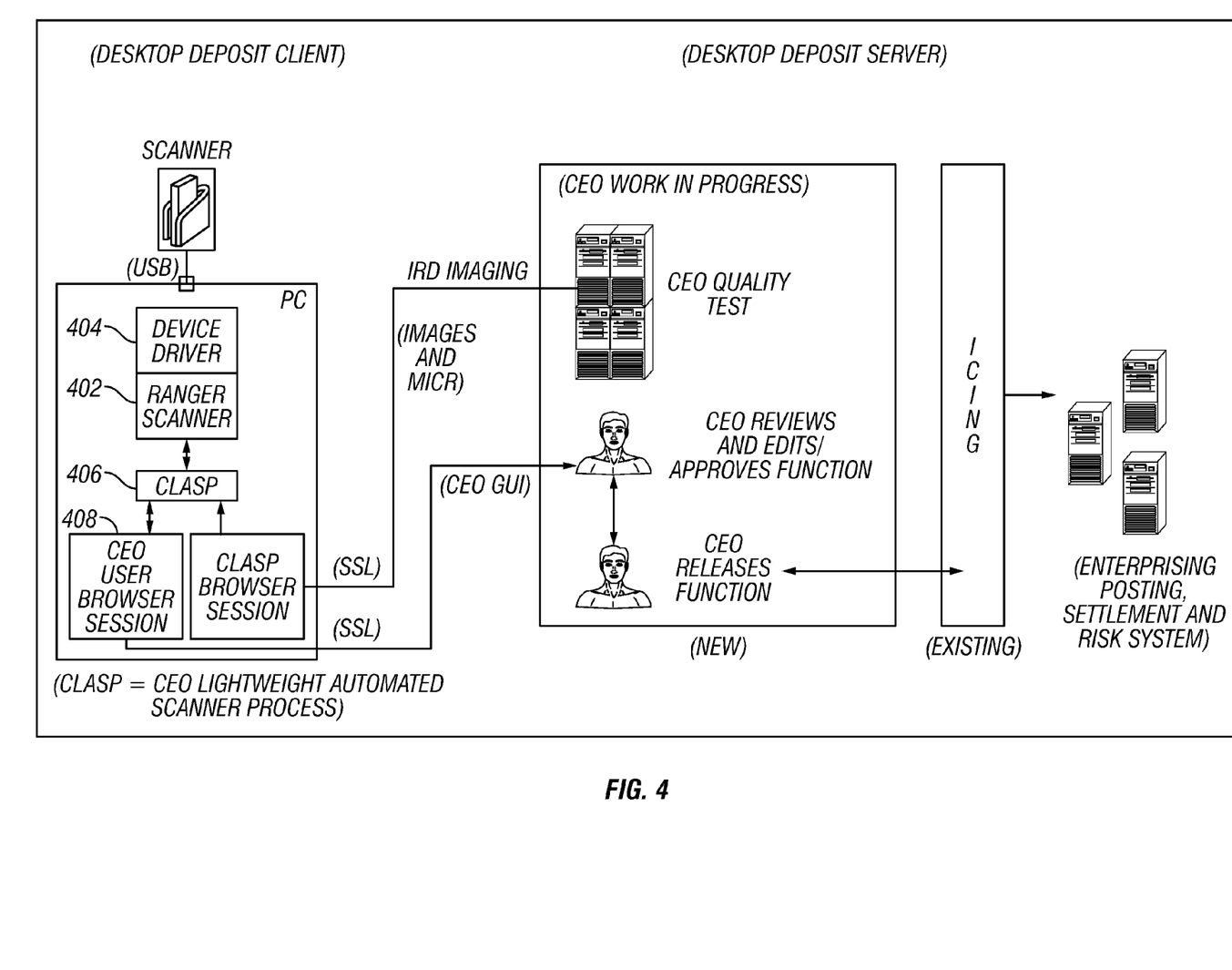
FIG. 4 is a schematic context diagram illustrating how the CLASP component is used in the overall Desktop Deposit solution architecture according to the invention.

FIG. 4 is a schematic context diagram illustrating how the CLASP component is used in the overall Desktop Deposit solution architecture.

Device abstraction.

The Ranger API 402 provides an abstraction layer to the scanner driver 404 allowing applications to interface with different scanner types.

Accordingly, the CLASP component 406 uses the Ranger API 402 to talk to the underlying scanner drivers 404 with the understanding that there may be additional interface mechanisms required to be supported by the CLASP component in future.

Using the Ranger API 402 alone allows the CLASP component 406 to be lightweight while isolating the CEO application from having to code specifically to the Ranger API.

Automated Updates.

The CLASP component 406 is designed as a signed ActiveX control. The control is deployed as a cab, i.e. Windows cabinet, file. This allows the control to be downloaded automatically whenever a new version of the control is posted to the CEO web server.

When the CEO application page references a new control version, the user's browser 408 automatically downloads or prompts for download of the control depending upon the browser security settings.

Security.

The CLASP component 406 depends on the security already built by the CEO application. The CLASP component is only invoked when the CEO application loads a specific resource, which contains a reference to the CLASP control. Moreover, the interaction of the CLASP component with the CEO application is only through http form posts. The CLASP component does not open any socket connections directly to the CEO servers.

The Ranger API 402 is itself packaged as an ActiveX control and hence is used by the CLASP component as an in-process server.

The CLASP component does not store any data locally on the user's computer nor does it use any temporary files outside of the browser's operating system (OS) dependent temporary file requirements.

Browser and OS.

By way of example, in one embodiment of the invention, the CLASP component is designed to work with the IE 5.01 (SP2) or IE 6 browsers. The operating systems supported are Windows XP and Windows 2000.

Supported Scanners.

In one embodiment of the invention, supported scanners are: Omega System of North America's Panini MyVision X30, X60, and X90 and which support the Silver Bullet Ranger API.

Extensibility.

The CLASP component architecture allows for extensibility to support multiple versions of scanner abstraction APIs as well as differences in functionality between these APIs.

An Exemplary Scanning Device

One embodiment of the invention provides means for building a device wrapper or Ranger-wrapper ActiveX that can return images as Base64 strings. It provides a control that can take scanned image(s) and package them up into a string that can be transmitted to the enterprise server, such as CEO. One embodiment of the invention provides a means for transmitting them to CEO that includes setting up the images using a Base64 encoding scheme and transmitting the images to CEO as a standard HTML form-post. The invention provides a means for the control or device that takes the current image as an argument, such as front-1, front-2, reverse-1, or reverse-2, and returns a Base64 encoded string. In one embodiment of the invention, the code returns just the Base64 string without any MIME information. It is possible to prefix the string with additional information as well as return just the raw Base64 string.

In one embodiment of the invention, the Base64 encoder performs the call to read the address and byte-count rather than the application. The Base64 encoder should be passed a front, rear, grayscale, or bi-tonal parameter in the same manner that the GetImageAddress( ) and GetImageByteCount( ) methods are designed to do as in a standard call. A name for the functionality that is suggestive to its function is, Ranger-ImagetoBase64(long side, long ColorType). Such name is by way of example only and is not meant to be limiting.

In another embodiment of the invention, the images are set up following the HTP multi-part format, or, in other words, the format used when an HTML page requests a file from a user. Such embodiment may lend itself to have more complexity in the programming logic: Web logic has to be able handle multi-part POSTs correctly, when some may be configured to handle x-www-form-urlencoded MIME type only, such as older versions of servlet code. Another challenge may be encountering character set mapping issues, such as ISO-8859-1 vs. UTF-8, for the characters used to represent the image.

Visual Scenario Depicting Control and Data Flow

Figure 5:
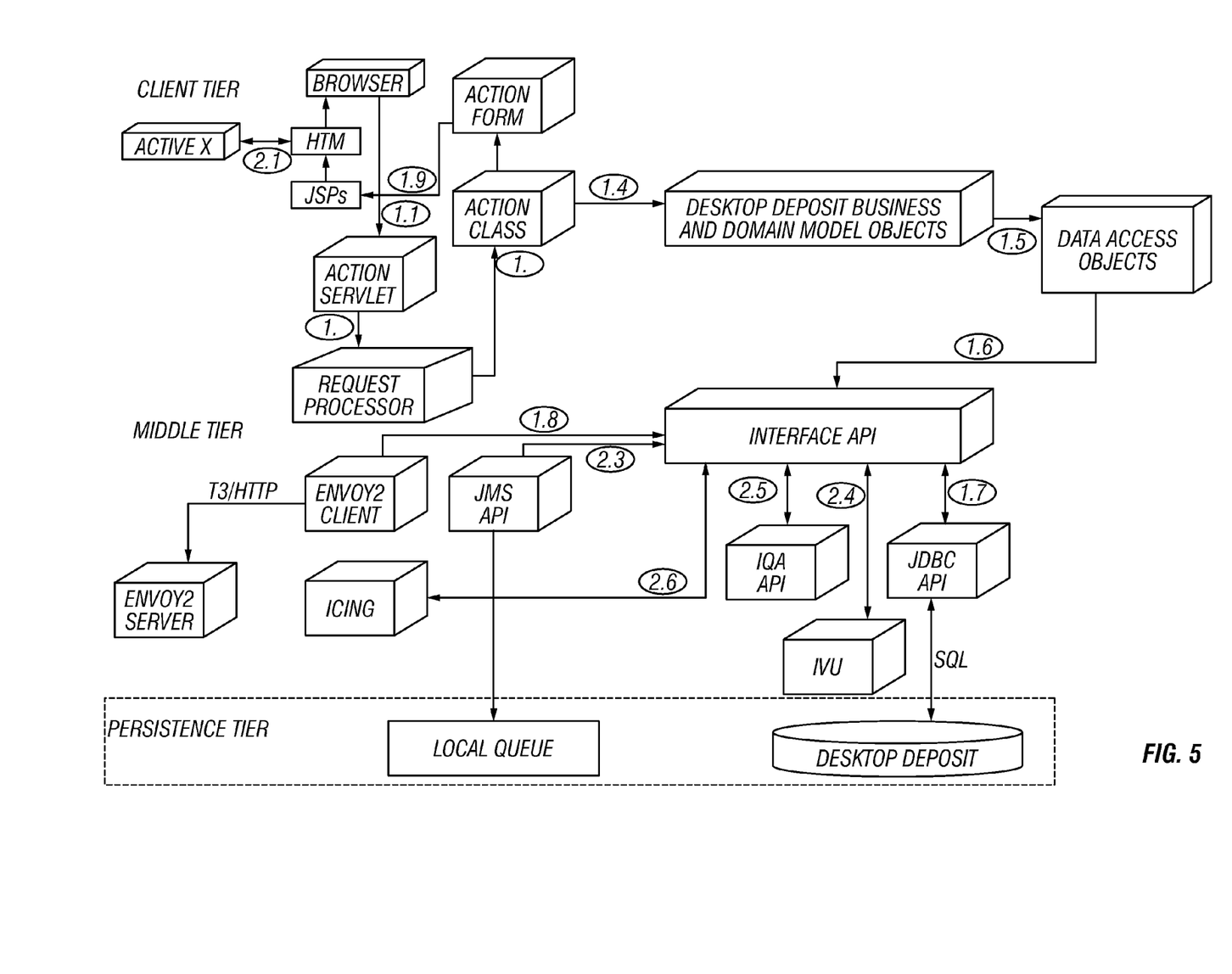
FIG. 5 is a schematic flow diagram depicting the control flow according to the invention.

With reference to FIG. 5, a means for control flow according to the invention can be described. It should be appreciated that the details are by way of example and are not meant to be limitng.

In step 1.1, a user clicks on a button on a browser screen in Desktop Deposit. The javascript submits the form data to the Desktop Deposit gateway servlet, which invokes Action Servlet, along with the Action. In step 1.2, the Action Servlet invokes the Request Processor class. In step 1.3, the Request Processor invokes the appropriate Action Class and sets Action Form. In step 1.4, the Action Class builds the appropriate domain object from the data. It does a look-up, calls an appropriate Business Object (BO), invokes the appropriate method on it, and passes the domain object to it. In step 1.5, the BO evaluates the business rules, if any, calls one or more Data-Access Object, invokes appropriate method on it, and passes the domain object(s) to it. In step 1.6, the DAO makes one or more Interface API method calls to the access to the Database, Envoy2. In step 1.7, tor Database Calls, JDBC is the communication mechanism for accessing Local Desktop Deposit database. In step 1.8, for WPR access, the Envoy2 Client talks to Envoy2 Server hosted externally with appropriate protocol. In step 1.9, the JSP extracts data from the Action Form and builds the screen HTML and sends it to the browser. In step 2.1, VBScript/JavaScript is used for interacting with ActiveX, this will in turn iterface with Scanner. In step 2.2, Actions or steps 1.2, 1.3, 1.4, 1.5, 1.6 are performed. In step 2.3, Business Layer interacts with JMS layer to put the data in JMS queue. In step 2.3, Image Viewer Utility is used for manipulation of the checks. In step 2.4, Image Quality Analyser uses wfxml protocol to interact with IQA Service. And, in step 2.5, Interface API uses JMS to interact with ICING.

Assumptions

Following is a list of assumptions in the building of the system and method according to the invention:

User can have multiple sessions per day;

User can have multiple deposit account numbers. A user is given a choice of authorized accounts. While the average might be around five (5) accounts, some users are authorized to a couple of hundred accounts. The application will display the deposit account number, RTN and name;

User can receive multiple items from the same person, including OTC and new account checks;

Deposit bag is a holding/receiving area until the customer commits the deposit. Items are not committed to ICING until the bag is closed;

Trickle-in approach. This does not preclude a batch approach, but the customer experience with a long upload may trigger an unexpected timeout. Recommend configurable option on client and servlet code to render some flexibility;

The image message is based on standard HTTP protocol to port 443 and not proprietary transmission forms, including FTP;

The client can elect to have the OCR information and/or image sent back from the server as an acknowledgment for each scanned item; and The application is not limited to checks. The application should be able to handle any scanned image type. The application may be expanded to include file uploads.

An Exemplary Client Flow

Figure 6:
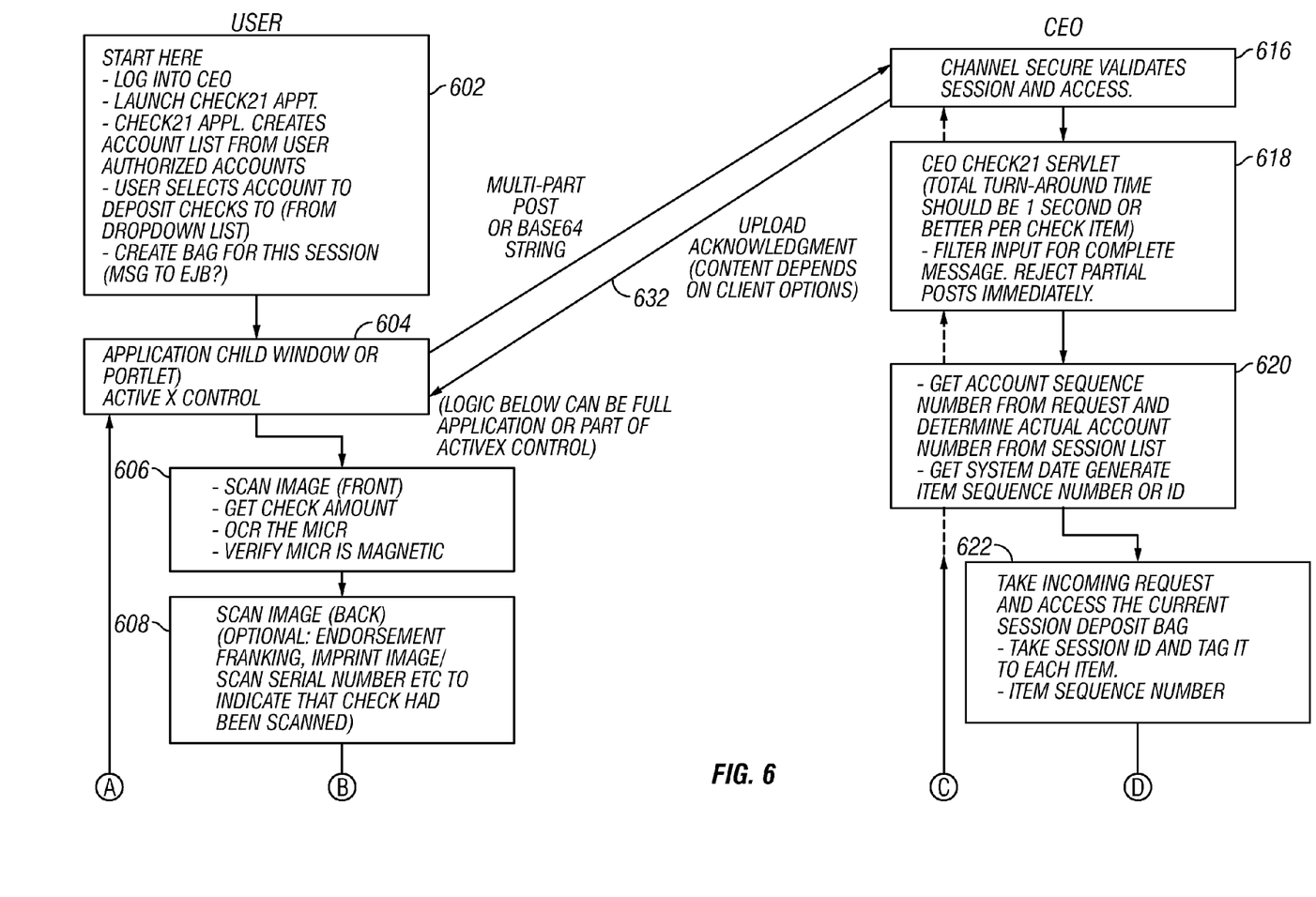
FIG. 6 is a schematic flow diagram showing an exemplary client flow according to the invention.

Referring to FIG. 6, a schematic flow diagram, an exemplary client flow according to the invention can be described. A user begins by logging into a CEO system. A Check21 application launches in response and creates an account list from the user's authorized accounts. The user selects an account to which to deposit checks to, e.g. from a dropdown list. The system creates a bag for this session 602.

An application child or window opens and is an ActiveX control. The logic following (from 606 through 614) can be performed by a full application or can be part of an ActiveX control. Regardless, the front of an image is scanned 606. The check amount is obtained, the MICR is OCRed, and it is verified that the MICR is magnetic.

The image back is scanned 608. Optionally, it is detected whether the check is endorsed. The system uses a checking means, such as checking for an imprint image, a scanned serial number, and the like, to indicate that the check had been properly scanned.

An HTTP POST is prepared 610. Amount is formatted, MICR information, such as RTN, account, amount, RAA, and the like, is formatted. This may be a unique hash.

Image front and image back are added to a POST message. It is optional to take in customer free-form text information 612.

The following information is sent to CEO 614:
receive ack. RAA; and
receive optional image(s) based on a flag means.

The user prepares to scan next item. If the hopper is empty, the system and method allows the user to select another account and may leave previously selected account highlighted 614.

By a messaging means, such as a multi-part POST or BASE64 string sent to the CEO system, a channel secure session is validated and access is open 616.

The CEO Check21 Servlet filters input to check if the message is complete 618. It rejects partial POSTs immediately. The total turn-around time is preferably one second or better per check item.

The account sequence number is obtained from the request and the actual account number is determined from the session list 620. The system date is also obtained. The item sequence number or identification (ID) is generated.

The CEO system and method then takes the incoming request and access the current session deposit bag 622. It takes the session ID and tags it to each item, having identified the item sequence number.

The CEO system and method checks for any additional validations to be performed 624.

In one embodiment of the invention, the CEO system and method then writes the information and images to the cache server 626.

A trigger type of indicator is posted to EJB to save the image and information into the user virtual database 628.

An acknowledgment/post receipt of each item is sent, such as echo RAA 630. Optionally, an echo front, back image, and/or receipt information is sent.

The acknowledgment is uploaded to the user's client, the content of which depends on the client options.

Figure 7:
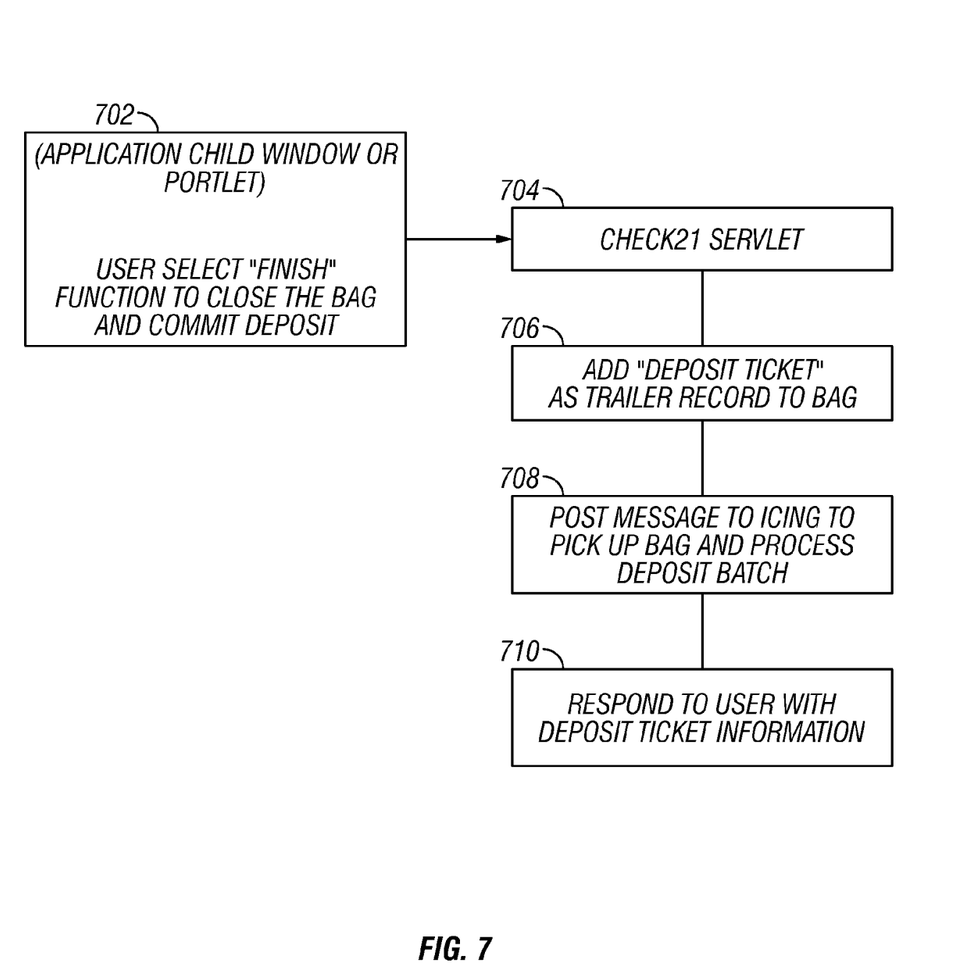
FIG. 7 is a flow diagram showing the client flow after the client elects to commit uploaded contents according to the invention.

The client flow after the client elects to commit uploaded contents can be described with reference to FIG. 7, a flow diagram showing the same. Via an application child window it portlet, a user selects a finish scanning means. The finish function closes the bag and commits to a deposit. The message is sent to the Check21 servlet 704. The servet adds a deposit ticket means as a trailer to the bag 706. A message is posted to ICING to pick up the bag and process a deposit batch 708. The servlet responds back to the user with the deposit ticket information 710.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for transmitting captured objects from a capturing device in real-time from one or more client components through an enterprise server component to one or more enterprise backend processing components, comprising the steps of:

one or more client components creating a session with a component on an enterprise server;

responsive to said creating a session, said enterprise server launching an enterprise application and downloading one or more corresponding runtime components onto said one or more client components;

from a browser window on said one or more client components, executing said one or more runtime components to invoke interface APIs of a capturing device, and on said browser window displaying an interface to said enterprise application for accessing said enterprise application;

from the browser runtime components, calling capturing device interface APIs to communicate with said device, wherein said capturing device interface APIs make device driver calls to said capturing device;

capturing one or more objects through said capturing device;

from said one or more runtime components, optionally calling capturing device interface APIs to direct said device to selectively extract additional information from each said captured object;

said browser runtime components pre-processing said captured objects to ensure message consistency and compatibility with said enterprise server;

transmitting said captured one or more objects and, if available, said selectively extracted additional information, to a repository communicably connected to said enterprise application for enterprise backend post-processing; and said browser runtime components detecting exception conditions on said capturing device and, if within scope of said runtime components, handling exception conditions, and passing said detected exception conditions and said handled exception conditions, as well as unhandled exception conditions and ancillary information to said enterprise server component;

wherein no captured objects are stored on said one or more client components.

2. The computer implemented method of claim 1, wherein said capturing device is a scanning device and said one or more captured objects is one or more scanned images.

3. The computer implemented method of claim 2, wherein any of said scanned one or more images for deposit is a bank check, coupon, or document.

4. The computer implemented method of claim 2, wherein future plugins are supported that work with a variety of scanning device protocols, scanning devices, and documents.

5. The computer implemented method of claim 2, wherein said scanning device returns scanned images and any extracted information to said plugin as Base64 string and plain-text for some selectively extracted regions, and said plugin prepares image and extracted information to the browser as a combination of Base64 strings and plain-text within a HTTP message, which can be further transmitted to said enterprise server component as an HTTP message.

6. The computer implemented method of claim 2, further comprising the step of:
providing a deposit bag that serves as a holding area until a deposit is committed.

7. The computer implemented method of claim 1, wherein said runtime components are any of plugins or ActiveX components.

8. The computer implemented method of claim 1, wherein said selectively extracted information is any of: a Magnetic Ink Character Recognition (MICR) line, written text, or a bar-code.

9. The computer implemented method of claim 1, wherein said one or more client components are developed as ActiveX controls that are downloadable over the Web.

10. The computer implemented method of claim 1, wherein said one or more client components provide an interface such that said enterprise application interacts with said scanning device.

11. The computer implemented method of claim 1, wherein said one or more client components provides an abstraction layer to said capturing device such that said enterprise application interfaces with one or more different capturing device types.

12. The computer implemented method of claim 1, further comprising the step of:
responsive to a new version of said one or more client components posted to said enterprise server component, said browser initiating a download of said one or more client components of the new version.

13. The computer implemented method of claim 1, wherein said one or more client components interact through HTTP messages.

14. The computer implemented method of claim 1, wherein said capturing one or more objects is performed in parallel with said transmitting said captured one or more objects, whereby a trickle-in approach is implemented.

15. The computer implemented method of claim 1, wherein any of said captured one or more objects is replaced by a file upload.

16. A system for transmitting captured objects from a capturing device in real-time from one or more client components through an enterprise server component to one or more enterprise backend processing components, comprising:
means for one or more client components creating a session with a component on an enterprise server;
responsive to said creating a session, means for said enterprise server launching an enterprise application and means for downloading one or more corresponding runtime components onto said one or more client components;
from a browser window on said one or more client components, means for executing said one or more runtime components to invoke interface APIs of a capturing device, and on said browser window means for displaying an interface to said enterprise application for accessing said enterprise application;
from the browser runtime components, means for calling capturing device interface APIs to communicate with said device, wherein said capturing device interface APIs make device driver calls to said capturing device;
means for capturing one or more objects through said capturing device;
from said one or more runtime components, means for optionally calling capturing device interface APIs to direct said device to selectively extract additional information from each said captured object;
means for said browser runtime components pre-processing said captured objects to ensure message consistency and compatibility with said enterprise server;
means for transmitting said captured one or more objects and, if available, said selectively extracted additional information, to a repository communicably connected to said enterprise application for enterprise backend post-processing; and
means for said browser runtime components detecting exception conditions on said capturing device and, if within scope of said runtime components, handling exception conditions, and means for passing said detected exception conditions and said handled exception conditions, as well as unhandled exception conditions and ancillary information to said enterprise server component;
wherein no captured objects are stored on said one or more client components.

17. The system of claim 16, wherein said capturing device is a scanning device and said one or more captured objects is one or more scanned images.

18. The system of claim 17, wherein any of said scanned one or more images for deposit is a bank check, coupon, or document.

19. The system of claim 17, wherein future plugins are supported that work with a variety of scanning device protocols, scanning devices, and documents.

20. The system of claim 17, wherein said scanning device returns scanned images and any extracted information to said plugin as Base64 string and plain-text for some selectively extracted regions, and said plugin prepares image and extracted information to the browser as a combination of Base64 strings and plain-text within a HTTP message, which can be further transmitted to said enterprise server component as an HTTP message.

21. The system of claim 17, further comprising:
means for providing a deposit bag that serves as a holding area until a deposit is committed.

22. The system of claim 16, wherein said runtime components are any of plugins or ActiveX components.

23. The system of claim 16, wherein said selectively extracted information is any of: a Magnetic Ink Character Recognition (MICR) line, written text, or a bar-code.

24. The system of claim 16, wherein said one or more client components are developed as ActiveX controls that are downloadable over the Web.

25. The system of claim 16, wherein said one or more client components provide an interface such that said enterprise application interacts with said scanning device.

26. The system of claim 16, wherein said one or more client components provides an abstraction layer to said capturing device such that said enterprise application interfaces with one or more different capturing device types.

27. The system of claim 16, further comprising:

responsive to a new version of said one or more client components posted to said enterprise server component, means for said browser initiating a download of said one or more client components of the new version.

28. The system of claim 16, wherein said one or more client components interact through HTTP messages.

29. The system of claim 16, wherein said capturing one or more objects is performed in parallel with said transmitting said captured one or more objects, whereby a trickle-in approach is implemented.

30. The system of claim 16, wherein any of said captured one or more objects is replaced by a file upload.

* * * * *